US010466687B2

(12) United States Patent
Diehr et al.

(10) Patent No.: US 10,466,687 B2
(45) Date of Patent: Nov. 5, 2019

(54) METHOD FOR CONTROLLING A FOLDING BOX MACHINE FOR QUALITY ASSURANCE

(71) Applicant: MASTERWORK GROUP CO., LTD., Tianjin (CN)

(72) Inventors: Wolfgang Diehr, Grevenbroich (DE); Mark Hammer, Duesseldorf (DE); Frank Matthias Schmid, Krefeld (DE)

(73) Assignee: Masterwork Group Co., Ltd., Tianjin (CN)

( * ) Notice: Subject to any disclaimer, the term of this patent is extended or adjusted under 35 U.S.C. 154(b) by 308 days.

(21) Appl. No.: 15/508,778

(22) PCT Filed: Jun. 17, 2015

(86) PCT No.: PCT/IB2015/000984
§ 371 (c)(1),
(2) Date: Mar. 3, 2017

(87) PCT Pub. No.: WO2016/034926
PCT Pub. Date: Mar. 10, 2016

(65) Prior Publication Data
US 2017/0293291 A1 Oct. 12, 2017

(30) Foreign Application Priority Data

Sep. 4, 2014 (DE) .................. 10 2014 013 166

(51) Int. Cl.
*G06F 19/00* (2018.01)
*G05B 19/418* (2006.01)
(Continued)

(52) U.S. Cl.
CPC ...... *G05B 19/41875* (2013.01); *B31B 50/006* (2017.08); *B31B 50/26* (2017.08);
(Continued)

(58) Field of Classification Search
CPC combination set(s) only.
See application file for complete search history.

(56) References Cited

U.S. PATENT DOCUMENTS 4,159,109 A * 6/1979 Watson .................. B65H 43/00
271/259
5,453,926 A * 9/1995 Stroschin ........... G05B 19/0426
700/83
(Continued)

FOREIGN PATENT DOCUMENTS

CA 2409330 A1 11/2001
CN 101229695 A 7/2008
(Continued)

*Primary Examiner* — Kidest Bahta
(74) *Attorney, Agent, or Firm* — Laurence A. Greenberg; Werner H. Stemer; Ralph E. Locher

(57) ABSTRACT

A method controls a folding box machine having a plurality of machining stations and a plurality of control devices for controlling the quality of folding boxes. Each control device controls different quality features of each folding box, and each control device transmits the result of the control to a control unit. Target values are stored in the control unit in order to classify the control results into results which meet the quality standard and results which do not meet the quality standard, and a folding box is discharged depending on an evaluation. The method advantageously reduces waste.

5 Claims, 1 Drawing Sheet

(51) Int. Cl.
  *B31B 50/00* (2017.01)
  *B31B 50/26* (2017.01)
  *B31B 50/62* (2017.01)
  *B31B 50/88* (2017.01)
  *B31B 100/00* (2017.01)

(52) U.S. Cl.
  CPC ............... *B31B 50/62* (2017.08); *B31B 50/88* (2017.08); *B31B 2100/002* (2017.08); *G05B 2219/32368* (2013.01); *G05B 2219/45056* (2013.01)

(56) References Cited

U.S. PATENT DOCUMENTS

| | | |
|---|---|---|
| 8,073,239 B1 | 12/2011 | Bahrami et al. |
| 8,506,464 B2 * | 8/2013 | Diehr ..................... B31F 1/07 493/144 |
| 8,820,594 B2 * | 9/2014 | Sakane .................. D06F 89/02 223/37 |
| 8,926,486 B2 | 1/2015 | Diehr et al. |
| 2009/0079971 A1 | 3/2009 | Toma et al. |
| 2012/0053031 A1 | 3/2012 | Diehr et al. |
| 2013/0177233 A1 | 7/2013 | Bellino |

FOREIGN PATENT DOCUMENTS

| | | |
|---|---|---|
| CN | 104096686 A | 10/2014 |
| DE | 102009053561 A1 | 6/2010 |
| EP | 0382466 A2 | 8/1990 |
| EP | 1964779 A2 | 9/2008 |
| EP | 1920910 B1 | 12/2009 |
| EP | 2623305 A1 | 8/2013 |
| EP | 2422969 B1 | 9/2013 |
| JP | H08103976 A | 4/1996 |
| NL | 1016532 C1 | 5/2002 |
| WO | 0187582 A1 | 11/2001 |
| WO | 2013118080 A1 | 8/2013 |

* cited by examiner

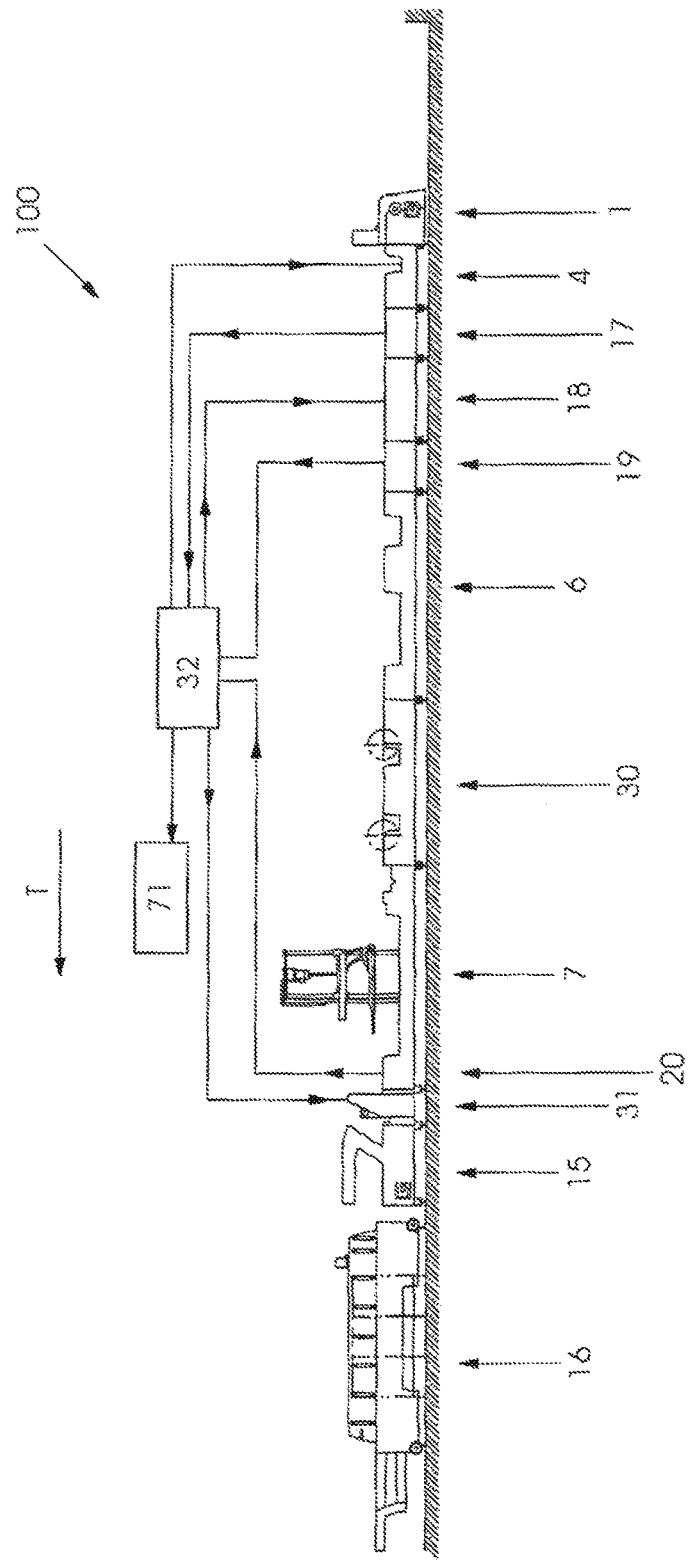

METHOD FOR CONTROLLING A FOLDING BOX MACHINE FOR QUALITY ASSURANCE

The present invention relates to a method for controlling a folding box machine having the features of claim 1.

PRIOR ART

In the production of high-quality printed products such as folding boxes for the pharmaceutical and cosmetic industry, there is a high demand for quality of both the printed sheets as wells as the punched folding box blanks and the completely folded and glued folding boxes. Moreover, there is a high demand in the pharmaceutical industry for the accurateness of the imprints and braille embossments of the produced folding boxes. Thus, in the production, the folding box production workflow requires frequent checks for errors, such as relating to the following quality features:

Paper defects such as board inclusions
Foreign particles such as dust, undesired film residue, cutting waste, adhesive labels and glue residue
Color deviations or varnish defects (missing varnish, varnish on surfaces where it ought not to be, splashes of varnish), blurred contours
Register errors
Errors in the text
Hot-foil stamping errors (holes in the surface, frayed edges, missing areas)
Scratches and other mechanical defects in the surface of the sheet (in the unprinted board, in the printed image, in the varnish or in the film)
Matrix codes
Missing windows or other applications from previous production steps
Sorting accuracy of multiple-up sheets,
Conformity of bar codes and/or braille embossments and the readable table of contents
Accurateness of the braille embossments with regard to the position, volume and height of the braille dots.

For the production of folding boxes, the sheets are first subjected to printing in a printing machine. Multiple repeats of the folding boxes to be produced are printed on each sheet which are subsequently punched out in a punching device. The punched folding box blanks are then fed to a folding box gluing machine (folder gluer), which processes them into folding boxes.

Folder gluers for producing folding boxes from folding box blanks are known to include at least the following modules as processing units: a feeder which successively separates the blanks to be processed from a stack at a high speed and feeds them individually to a downstream first processing unit, an application unit for an adhesive, generally glue, which applies a strip of an adhesive to the folding flaps that are to be glued, and a folding unit in which the blank portions that have been provided with an adhesive strip are bent, i.e. folded, at a 180° angle to create an adhesive bond.

The folding unit is usually followed by a so-called transfer unit in which the boxes can be counted, marked, and discharged if they are defective.

The next unit is usually a pressing unit at an inlet of which a shingled stream of folded blanks is formed, which is then subjected to pressure for a certain period of time in the pressing station to bond the two blanks at the glue line.

The individual processing units include driven conveying elements for transporting the folding box blanks. Such conveying elements may, for instance, be formed of an upper conveying belt and a lower conveying belt disposed on a side of the machine. The lower conveying belt is guided in a roller cheek and the upper conveying belt is guided in a roller track. The conveying belts are disposed to be transversely adjustable and can thus be adapted to the respective size and format of the folding box blanks. The folding boxes are transported between the upper and lower conveying belts with their printed side facing downward.

In mass production it is advisable to control possible defects inline in order to ensure that the manufactured products satisfy the quality requirements.

EP 1920 910 B1 discloses a control unit for braille embossments comprising a downstream ejection unit. The control unit follows directly after a braille embossing unit in a folding box gluing machine.

EP 1 964 779 B1 discloses a process of monitoring the quality of folding boxes produced in a folding box gluing machine. By withdrawing predetermined samples in a packing facility, the operator can regularly check the box quality.

EP 2 422 969 B1 discloses a folding box gluing machine comprising a plurality of control devices. For example, an image inspection device and a braille embossing control device are proposed. The data of the control devices are evaluated by a common control unit. In case one of the control devices detects an error, the folding box is ejected by a subsequent ejection unit.

Today, in known quality systems all quality criteria must be satisfied to evaluate a box as "good". In other words, a box is "bad" until all control sites have confirmed that they are "good". This ensures, for example, that missing quality criteria, such as in case of a sensor failure, are judged as "not good", resulting in an ejection also of these boxes.

Industry defines quality criteria in so-called AQL for folding boxes. AQL means "Acceptable Quality Level", formerly "Accepted Quality Level". The AQL define the number of defects which are allowed to be contained in a defined control sample. The consumer goods industry, i.e. the buyer of folding boxes, strives to obtain only 100% defect-free folding boxes, while the folding box manufacturers are striving for maximal margins of error, thereby having a low degree of macul ature.

SUMMARY OF THE INVENTION

It is an object of the present invention to disclose a process for controlling a folding box machine in order to control the quality of folding boxes which reduces waste and at least partially eliminates the problems of the prior art.

This object is solved by a process for controlling a folding box machine having the features of claim 1.

The process of the present invention serves to control a folding box machine, in particular a folding box gluing machine, having a plurality of processing units and a plurality of control devices comprising detection means, which can be provided as sensors or cameras, in order to control the quality of folding boxes. The respective control devices control different, i.e. differing quality features of a respective folding box, and signal the result of the control to a control unit which comprises a computer and may be equipped with a display and a user interface. Target values are stored in the control unit to allow classification of the control results into sufficient quality results (good quality) and insufficient quality results (quality not good). The quality of the respective folding box is thereby determined. Depending on the evaluation of the classification of all control results the control unit, the control unit activates an ejection device, for example a reject gate, a plate ejector or an ejection belt, to eject a folding box.

In a particularly advantageous and therefore preferred embodiment of the process of the present invention, a digital string (for example, 001) of binary values (for example, 0 and 1) is generated from the classification of all control results for a respective folding box in the control unit. A respective string therefore represents a determined combination of defects. in an advantageous development of the process of this invention, the control unit stores strings with all combinations of the binary values, and it is determined for each string, and can also be determined by an operator, whether the folding box should be ejected because the total quality is insufficient. An inspection filter is thereby formed in the control unit.

It is further considered to be beneficial to store a defect limit in the control unit for a respective string, i.e. a percentage of how often a certain combination of defects may occur without an ordered lot to be rejected by the customer. Such a defect limit can also be stored for a group of strings.

In the present invention, the quality characteristics can be the following:
A code on the adhesive tab
Printed impression
Metallization or lacquering of partial surfaces
imprinted code correct
Delta E (measure of the perceived color difference)
Quality of ornamental embossment
Glued window
Braille lettering present, complete, correctly embossed, . . .
Glue joint
Rotation of folding box
Length control of folding box.

It can further be referred to quality features mentioned further above.

The present invention also relates to a computer program comprising program code means in order to carry out the above-mentioned method when the computer program is carried out on a control unit which is connected to a plurality of control devices.

The present invention also relates to a computer program product program with program code means stored on a computer-readable data carrier in order to carry out the above-mentioned method when the computer program is carried out on a control unit which is connected to a plurality of control devices.

The described invention and the described beneficial embodiments of the invention are also preferable developments of this invention in combination, insofar as this is technically meaningful.

For further advantages and further constructional and functional advantages of the present invention, it can be referred to the dependent claims and the description of embodiments while referring to the attached figures.

BRIEF DESCRIPTION OF THE DRAWING

The present invention is explained in more detail with reference to the enclosed figure. For sake of clarity of the figure, the representation not to scale.

FIG. 1 schematically shows a folding box gluing machine which is controlled in accordance with the present invention.

DESCRIPTION OF THE INVENTION

FIG. 1 shows a folding box gluing machine 100 according to an inventive embodiment. If seen in the transport direction T of the folding boxes, it comprises, for example, the following processing stations: a feeder 1, an alignment station 4, a control device 17 for two-dimensional error control, a braille embossing device 18, followed by braille embossing control device 19, a pre-folding station 6, a set-up folding box station 30, a folding station 7, a further control device 20, an ejection module 31, a transfer station 15 and a collecting and pressing device 16. The processing stations and their order should be considered as only exemplary. Likewise, the arrangement and number of control devices 17, 19, 20 is only exemplary. If a higher number of quality features is to be examined, a significantly higher number of control devices can be used. It is also possible that one control device controls several quality features. The control station 17 is connected to a control unit 32 to transmit data of defective boxes to this control unit. An evaluation of the control results is carried out in the control unit 32. Depending thereon, the control transmits signals to ejection unit 31 to eject these defective boxes. In the braille embossing control device 19, the braille embossments are examined as to their height, area and volume, i.e. they are examined topographically f defects. Furthermore, the position of the braille embossment with respect to the box edge and the completeness and correctness of the embossment is analyzed. The data are then either shown on a display so as to allow an operator to carry out respective corrections manually, or are transferred via the control 32 to the respective station to allow an automated adjustment or ejection. In the further control device 20, further box features can be examined, for example the quality of the folds. The result of the control is fed back to the control 32.

The working principle of the control method and the quality control is explained in more detail in the following.

An arbitrary number of quality features or quality criteria is assigned to each box in a predetermined order. Each quality criterion can have a value of "1" or "0", i.e. "good" or "bad". An un-transmitted signal is evaluated like "0". The number of quality criteria make up a digital string which can also be termed "box ticket" or Folding Box Quality Format.

The following describes in more detail an example with three quality criteria: "code on adhesive tab", "box rotation>2°" and "braille lettering present".

The digital string can have the following values:
000 Code wrong, box rotation>2°, braille lettering missing
001 Code wrong, box rotation>2°, braille lettering correct
010 Code wrong, box rotation<2°, braille lettering missing
100 Code correct, box rotation>2°, braille lettering missing
011 code wrong, box rotation<2°, braille lettering correct
101 code correct, box rotation>2°, braille lettering correct
110 code correct, box rotation<2°, braille lettering missing
111 code correct, box rotation<2°, braille lettering correct It is conceivable that all boxes having 111 reach the transport stage.

Moreover, boxes identified by "101" can be used in case the box rotation of>2° and a resulting slant adhesion can be accepted.

In view of above-mentioned AQL, boxes identified by "101" could reach the transport stage with a predetermined percentage and be ejected as soon as the maximum number of defects has been reached.

Alternatively, the boxes identified by "101" are merely marked to allow their collection as second quality, or they are assigned to another transport area by a suitable sorting system.

The determination whether a box is to be ejected for a certain string, i.e. in case of a certain combination of defects, can be also be given depending on the product to be produced. For example, in case of a pharmaceutical folding box, an ejection can always be made if the quality of imprinted text, braille lettering or code is insufficient, independently from the further quality features. On the other hand, in case of cosmetic packaging, more importance can be placed on the optical appearance and quality features like ornamental embossments, metallization, color or the like.

By a control method as described, the following advantages can be obtained:

Sorting according to different quality criteria, first choice, second choice, third choice, is possible AQL can be met Continuous evaluation of AQL, as a moving average, in lots of 1,000 boxes, etc.

Variable design of the quality criteria depending on the customer segment (pharma, cosmetics, food, non-food, confectionery, . . . ) or depending on the customer And overall a reduction of waste, i.e. of maculature.

The invention claimed is:

1. A method for controlling a folding box machine having a plurality of processing stations and a plurality of control devices with detection devices to control a quality of folding boxes, which comprises the steps of:
   using a respective control device to control different quality features of a respective folding box;
   reporting, via the respective control device, a result of a control operation to a control unit;
   storing target values for classifying control results into results of the target values being met or not met in the control unit;
   activating an ejection device via the control unit to eject the respective folding box in dependence on an evaluation of a classification of all the control results;
   generating a combination of defects as a digital string from binary values based on the classification of all the control results for the respective folding box, wherein each binary value corresponds to a control result of the different quality features; and
   storing a detection limit for a respective digital string in the control unit, wherein the detection limit indicates how often a certain combination of defects belonging to the respective digital string may occur until the respective folding box is to be ejected.

2. The method for controlling the folding box machine according to claim 1, wherein the quality features are a quality of a printed image, the quality of an embossment, the quality of a Braille lettering, a presence of a code, a window, a glue line, and/or dimensions of the respective folding box.

3. The method for controlling the folding box machine according to claim 1, wherein the folding box machine is a folding box gluing machine.

4. A computer program for running on a control unit connected to a plurality of control devices, the computer program performing the method according to claim 1.

5. A non-transitory computer-readable data carrier storing computer executable instructions to be executed by a control unit connected to a plurality of control devices, the computer executable instructions performing a method for controlling a folding box machine having a plurality of processing stations and the plurality of control devices with detection devices to control a quality of folding boxes, the method comprises the steps of:
   using a respective control device to control different quality features of a respective folding box;
   reporting, via the respective control device, a result of a control operation to the control unit;
   storing target values for classifying control results into results of the target values being met or not met in the control unit;
   activating an ejection device via the control unit to eject the respective folding box in dependence on an evaluation of a classification of all the control results;
   generating a combination of defects as a digital string from binary values based on the classification of all the control results for the respective folding box, wherein each binary value corresponds to a control result of the different quality features; and
   storing a detection limit for a respective digital string in the control unit, wherein the detection limit indicates how often a certain combination of defects belonging to the respective digital string may occur until the respective folding box is to be ejected.

* * * * *